(12) United States Patent
Bahar et al.

(10) Patent No.: US 11,826,748 B2
(45) Date of Patent: Nov. 28, 2023

(54) ION EXCHANGE POLYMERS AND ION EXCHANGE MEMBRANES INCORPORATING SAME

(71) Applicant: Xergy Inc., Harrington, DE (US)

(72) Inventors: Bamdad Bahar, Georgetown, DE (US); Jack Saltwick, Harrington, DE (US); Zhefei Li, Harrington, DE (US)

(73) Assignee: FFI IONIX IP, INC., Wilmington, DE (US)

( * ) Notice: Subject to any disclaimer, the term of this patent is extended or adjusted under 35 U.S.C. 154(b) by 25 days.

(21) Appl. No.: 15/674,280

(22) Filed: Aug. 10, 2017

(65) Prior Publication Data

US 2018/0043346 A1 Feb. 15, 2018

Related U.S. Application Data

(60) Provisional application No. 62/373,325, filed on Aug. 10, 2016.

(51) Int. Cl.
| | |
|---|---|
| *B01J 47/12* | (2017.01) |
| *C08J 3/24* | (2006.01) |
| *C08J 3/28* | (2006.01) |
| *C08J 5/22* | (2006.01) |
| *B01D 69/10* | (2006.01) |
| *B01D 71/52* | (2006.01) |
| *B01D 71/82* | (2006.01) |
| *B01D 69/12* | (2006.01) |
| *B01J 39/04* | (2017.01) |

(Continued)

(52) U.S. Cl.
CPC ............. *B01J 47/12* (2013.01); *B01D 69/10* (2013.01); *B01D 69/12* (2013.01); *B01D 69/125* (2013.01); *B01D 71/52* (2013.01); *B01D 71/82* (2013.01); *B01J 39/04* (2013.01); *B01J 39/18* (2013.01); *B01J 41/04* (2013.01); *B01J 41/12* (2013.01); *C08J 3/244* (2013.01); *C08J 3/245* (2013.01); *C08J 3/28* (2013.01); *C08J 5/2256* (2013.01); *C08J 5/2262* (2013.01); *B01D 2323/30* (2013.01); *C08J 2371/00* (2013.01)

(58) Field of Classification Search
CPC ... B01J 47/12; C08J 3/244; C08J 3/245; C08J 3/28
See application file for complete search history.

(56) References Cited

U.S. PATENT DOCUMENTS

| | | |
|---|---|---|
| 1,925,281 A | 3/1934 | Ranque |
| 2,913,511 A | 11/1959 | Grubb, Jr. |

(Continued)

*Primary Examiner* — Ling Siu Choi
*Assistant Examiner* — David L Miller
(74) *Attorney, Agent, or Firm* — Invention To Patent Services; Alex Hobson

(57) ABSTRACT

An ion exchange membrane is provided which includes an ion exchange polymer that is partially cross-linked. The partially cross-linked ion exchange polymer will be more stable and will not be washed out over time. The ion exchange polymer may be UV or chemically cross-linked, wherein a cross-linking compound is added to the ion exchange polymer either before or after coupling to a support material. A support material may be made of, or be coated with, a cross-linking compound and the support material may initiate cross-linking proximal to the support material. The support material may be made of a material that chemically bonds with the ionomer.

13 Claims, 2 Drawing Sheets

(51) Int. Cl.
  *B01J 39/18* (2017.01)
  *B01J 41/04* (2017.01)
  *B01J 41/12* (2017.01)

(56) References Cited

U.S. PATENT DOCUMENTS

| | | | |
|---|---|---|---|
| 3,432,355 A | 3/1969 | Niedrach et al. | |
| 3,489,670 A | 1/1970 | Maget | |
| 4,118,299 A | 10/1978 | Maget | |
| 4,402,817 A | 9/1983 | Maget | |
| 4,523,635 A | 6/1985 | Nishizaki et al. | |
| 4,593,534 A | 6/1986 | Bloomfield | |
| 4,829,785 A | 5/1989 | Hersey | |
| 4,990,412 A | 2/1991 | Hersey | |
| 5,024,060 A | 6/1991 | Trusch | |
| 5,547,551 A | 8/1996 | Bahar et al. | |
| 5,599,614 A | 2/1997 | Bahar et al. | |
| 5,635,041 A | 6/1997 | Bahar et al. | |
| 5,746,064 A | 5/1998 | Tsenter | |
| 5,768,906 A | 6/1998 | Tsenter | |
| 5,900,031 A | 5/1999 | Bloomfield | |
| 5,976,724 A | 11/1999 | Bloomfield | |
| 5,993,619 A * | 11/1999 | Bloomfield et al. | H01M 8/0612 204/278 |
| 6,068,673 A | 5/2000 | Bloomfield | |
| 6,167,721 B1 | 1/2001 | Tsenter | |
| 6,254,978 B1 | 7/2001 | Bahar et al. | |
| 6,321,561 B1 | 11/2001 | Magel | |
| 6,425,440 B1 | 7/2002 | Tsenter et al. | |
| 6,553,771 B2 | 4/2003 | Tsenter | |
| 6,635,384 B2 | 10/2003 | Bahar et al. | |
| 6,841,601 B2 | 1/2005 | Serpico et al. | |
| 6,994,929 B2 | 2/2006 | Barbir et al. | |
| 8,231,997 B2 * | 7/2012 | Matsuoka | H01M 8/1004 429/122 |
| 9,051,431 B2 | 6/2015 | Kim et al. | |
| 2002/0066277 A1 | 6/2002 | Tsenter | |
| 2003/0155252 A1 | 8/2003 | Juda et al. | |
| 2003/0196893 A1 | 10/2003 | Mcelroy et al. | |
| 2004/0040862 A1 | 3/2004 | Kosek | |
| 2006/0230765 A1 | 10/2006 | Fedorov et al. | |
| 2006/0254286 A1 | 11/2006 | Johnson et al. | |
| 2008/0187794 A1 | 8/2008 | Weingaetner | |
| 2009/0214905 A1 | 8/2009 | Narayanan et al. | |
| 2009/0308752 A1 | 12/2009 | Evans et al. | |
| 2010/0291470 A1 * | 11/2010 | Sadasue | C08J 5/2243 429/483 |
| 2011/0198215 A1 | 8/2011 | Bahar | |
| 2013/0101921 A1 * | 4/2013 | Zhang | H01M 8/1072 429/492 |
| 2017/0136413 A1 * | 5/2017 | Choi | C08J 5/2231 |
| 2017/0138653 A1 | 5/2017 | Bahar | |

* cited by examiner

ION EXCHANGE POLYMERS AND ION EXCHANGE MEMBRANES INCORPORATING SAME

CROSS REFERENCE TO RELATED APPLICATIONS

This application claims the benefit of priority to U.S. provisional patent application No. 62/373,325, filed on Aug. 10, 2016 and entitled Ion Exchange Polymers and Ion Exchange Membranes Incorporating Same; the entirety of which is hereby incorporated by reference herein.

FIELD OF THE INVENTION

The present invention relates ion exchange polymers and ion exchange membranes incorporating these polymers and applications thereof.

BACKGROUND

One deficiency of current composite ion exchange membranes and, in particular, composite anion exchange membranes (AEM), is that the anionic ionomer washes out with continuous use and has poor chemical stability. Excellent proton conductivities are achieved, but they absorb excessive amounts of water at elevated temperatures. AEMs are formed by a polymeric backbone functionalized with fixed cationic groups and mobile counter anions, generally hydroxide ions, that sustain the conductivity. Anion conductivities are lower than proton conductivities, but similar dependencies on humidity and temperature have been reported. The low stability in severe basic conditions and low conductivity are the main problems of AEMs to be solved to increase the utility of these promising materials. Often the two issues are linked to each other, like in cation exchange membranes: high stability is related to low conductivity and vice versa.

U.S. Pat. No. 5,547,551 to Bahar et al. describes the advancement of ion exchange membranes by compositing acidic cationic ionomer material with microporous expanded poly(tetrafluoroethylene), providing greater support and chemical stability. The present invention involves a similar composite membrane employing anion exchange polymers.

SUMMARY OF THE INVENTION

The invention is directed to ion exchange polymers and ion exchange membranes incorporating these polymers and applications thereof.

This application incorporates by reference, in its entirety, U.S. provisional patent application No. 62/303,294, filed on Mar. 3, 2016.

This application incorporates by reference the following: U.S. provisional patent application No. 62/171,331, filed on Jun. 5, 2015 and entitled Electrochemical Compressor Utilizing a Preheater; U.S. patent application Ser. No. 14/859,267, filed on Sep. 19, 2015, entitled Electrochemical Compressor Based Heating Element and Hybrid Hot Water Heater Employing Same: U.S. patent application Ser. No. 13/899,909 filed on May 22, 2013, entitled Electrochemical Compressor Based Heating Element And Hybrid Hot Water Heater Employing Same; U.S. provisional patent application No.: 61/688,785 filed on May 22, 2012 and entitled Electrochemical Compressor Based Heat Pump For a Hybrid Hot Water Heater; U.S. patent application Ser. No. 14/303,335, filed on Jun. 12, 2014, entitled Electrochemical Compressor and Refrigeration System; U.S. patent application Ser. No. 12/626,416, filed on Nov. 25, 2009, entitled Electrochemical Compressor and Refrigeration System now U.S. Pat. No. 8,769,972; and U.S. provisional patent application No. 61/200,714, filed on Dec. 2, 2008 and entitled Electrochemical Compressor and Heat Pump System; the entirety of each related application is hereby incorporated by reference.

This invention involves the crosslinking of the ionomer in situ, to retain the ionomer in place within a composite matrix. Crosslinking can be accomplished by heat, UV or IR post treatment; or chemically by adding agents, within the empty space of the substrate medium or a combination of methods.

For example, to reduce the water sorption of the membranes and improve their mechanical properties and dimensional stability, the protons in acidic sulfonated poly(ether ketone ketone) (SPEKK) membranes were partially exchanged with divalent barium cations to create ionic crosslinks between the sulfonate groups attached to the aromatic rings of the poly(ether ketone ketone). The degree of crosslinking was varied by changing the degree of neutralization of the ionomer. While ionic conductivity is reduced by crosslinking, the thermal stability, swelling, and barrier properties were improved.

Crosslinking reduces the water swelling at room temperature, and prevents membrane dissolution, especially at elevated temperatures. Crosslinked (XL) polymers can be obtained by in situ reticulation. Thermal and mechanical stability are improved. The formation of cross-linked AEM in situ in within the matrix of a substrate is provided.

Another example may be the reaction of one or more ionomers, or an ionomer precursor within the matrix of the substrate, with one or more crosslinking agents including polyisocyanates, blocked polyisocyanates, polyurethane prepolymers, blocked polyurethane prepolymers, polyurea prepolymers, blocked polyurea prepolymers, polyamines, blocked polyamines, trimethylamine, tetramethyl-1,6-hexanediamine, and dicyanodiamides. The resulting modified ionomer compositions within the composite membrane exhibit increased tensile strength and decreased tensile elongation as compared to the un-crosslinked composite membrane.

A specific example involves the use of poly(arylene) or poly(styrene)-based polymers or copolymers functionalized with quaternary ammonium groups. Crosslinking in these systems can be performed within the support matrix using trimethylamine or tetramethyl-1,6-hexanediamine solution.

Another instance involves the use of an ionomer precursor (often functionalized with a tertiary amine group) and 1,5-diazabicyclo[4.3.0]non-5-ene (DBN) or 1,4-diazabicyclo[2.2.2]octane (DABCO) as a quaternizing agent, which accomplishes formation of quaternary ammonium groups within the substrate. Due to the presence of two nitrogens in these rings, the positive charge can be better stabilized making the polymer degradation more difficult. Subsequent crosslinking with one of the above agents may be performed to produce a crosslinked composite anion exchange membrane.

Crosslinking of the ionomer within the support material may also be performed by exposing the composite to ultraviolet light.

The ion exchange polymer may be imbibed into or coated onto a support material, such as a woven, non-woven or a membrane. An exemplary support material is a porous polymeric material, or porous fluoropolymer. Porous support materials may comprise or consists of polymers such as polypropylene, such as Celgard available from Celgard Inc., polyethylene, or polyvinylidene fluoride. An exemplary porous polymeric support material is microporous expanded polytetrafluoroethylene (PTFE) membrane, available from vendors such as TTG, Inc. An exemplary microporous expanded polytetrafluoroethylene (PTFE) membrane has a mean flow pore size, as measured by a Coulter Porometer, of about 1 µm or less, and preferably less than about 0.5 µm, and in some cases less than about 0.3 µm. A microporous membrane with a small pore size may facilitate imbibing of an ionomer into the porous structure due to higher capillary forces and may then retain the ionomer better than larger pore size microporous membranes. A small pore size microporous membrane may have a high specific surface area, such as about 5 $m^2/g$ or more, such as about 10 $m^2/g$ or more, such as about 20 $m^2/g$ or more and any range between and including the specific surface areas provided. A microporous membrane having a high specific surface area may be preferred as it may provide more surface area to bind the ionomer within the structure and may enable the ionomer to imbibe into the microporous structure more easily and quickly. As exemplary microporous PTFE membrane is described in U.S. Pat. No. 7,306,729, to Bacino, et al; the entirety of which is hereby incorporated by reference herein. Porous support materials such as microporous fluoropolymers may be imbibed with an ionomer, wherein the ionomer substantially fills all the void volume or pores within the membrane.

A porous membrane, or microporous expanded PTFE membrane may be described as having nodes that are interconnect fibrils that extend between nodes. The space between the fibrils and nodes may define a pore. An ionomer may be cross-linked, or partially cross-linked before or after incorporation of a support material. For example, an ionomer may be partially cross-linked and then imbibed into a microporous expanded PTFE membrane. In a more preferred embodiment, an ionomer, such an anion exchange ionomer, is imbibed into a microporous expanded PTFE membrane, and then partially cross-linked.

The surface of the support material may be coated with or may be made out of a cross-linking compound that will initiate cross-linking of the ionomer or may cross-link or otherwise bond with the ionomer. For example, a support material may be coated with divalent barium cations and when the sulfonated poly(ether ketone ketone) ionomer is imbibed, it will cross-link proximal to the surface of the support material. An ionomer that is chemical bound with a cross-linking compound coated onto or part of the support material creates an interface layer with the support material. This controlled and engineered location of the cross-linking may keep the remaining portion of the ionomer more conductive. Moisture uptake and swelling may be prevented by cross-linking in an organized configuration along the support surface.

In an exemplary method, an ionomer is imbibed into a porous support material and then partially cross-linked and may be cross-linked with the support material to form an interface layer. The porous support material may comprise a cross-linking compound, wherein the ionomer cross-links with the cross-linking compound. In an exemplary method, a first portion of an ionomer is imbibed into a porous support material, wherein only a portion or fraction of the void volume or pores is filed and then cross-linked before a second portion of ionomer is imbibed to fill the remaining void volume or pore structure. In any of the methods described, the porous support material may comprise a cross-linking compound and the porous support material may be an expanded PTFE membrane.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of his specification, illustrate embodiments of the invention, and together with the description serve to explain the principles of the invention.

Figure 1:
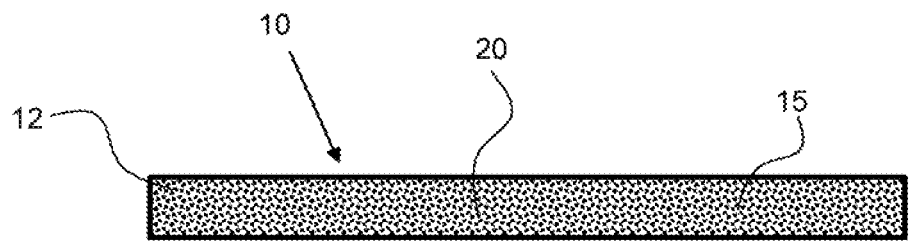
FIG. 1 shows a cross-section of an exemplary ion exchange membrane having partial cross-linking.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

The term ionomer and ion exchange polymer are used interchangeably throughout the application.

Different degree, as used herein to describe a difference in cross-linking between a first and a second portion of ionomer may include at least about 10% or more, about 25% or more, about 50% or more, about 100% or more, about 200% or more and any range between and including the percentages provided.

Figure 2:
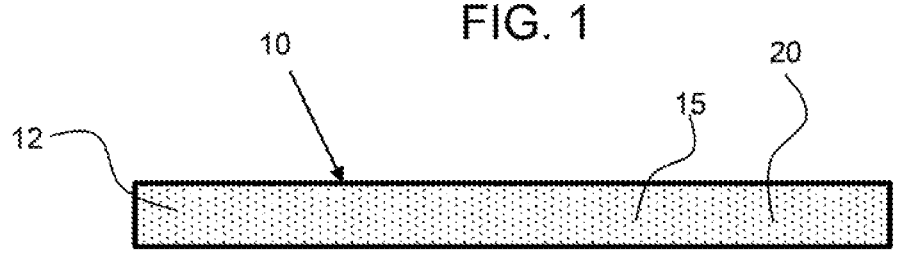
FIG. 2 shows a cross-section of an exemplary ion exchange membrane having partial cross-linking.

As shown in FIGS. 1 and 2, an exemplary ion exchange membrane 10 has partial cross-linking. The ionomer 12, or ion exchange polymer, comprises cross-linked portions 20, or cross-linked sites. The cross-linking is more substantial in FIG. 1 than in FIG. 2.

Figure 3:
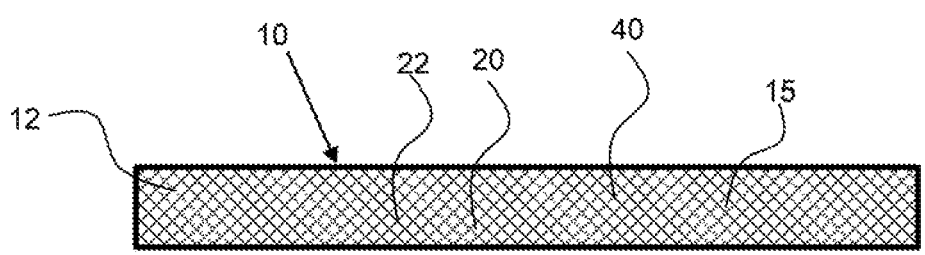
FIG. 3 shows a cross-section of an exemplary ion exchange membrane having a support material.

FIG. 3 shows a cross-section of an exemplary ion exchange membrane 10 having a support material 40. The support material extends substantially to the first and second side of the ion exchange membrane 10. The ionomer 12 has cross-linked portions 20 or cross-links 22 proximal to the support material.

Figure 4:
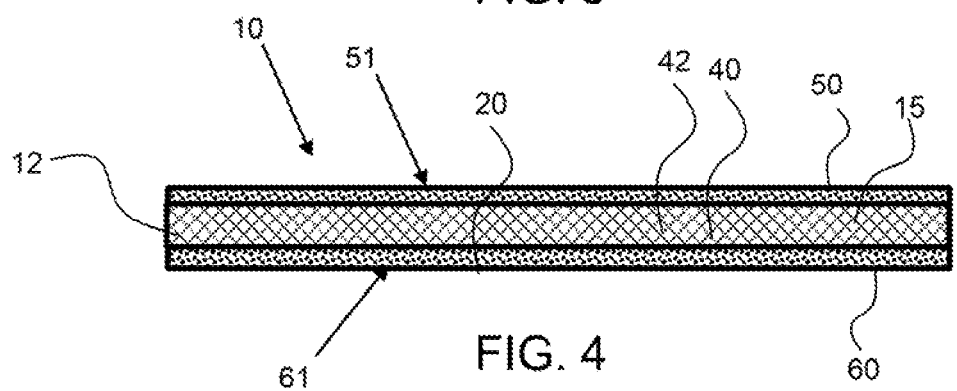
FIG. 4 shows a cross-section of an exemplary ion exchange membrane having a support material configured between a first ionomer layer on a first side and second ionomer layer on a second and opposing side to said first side.

FIG. 4 shows a cross-section of an exemplary ion exchange membrane having a support material 40 configured between a first ionomer layer 50 on a first side 51 and second ionomer layer 60 on a second side 61; opposing said first side. The ionomer layers comprise cross-linked ion exchange polymer 20 and the ionomer is bonded at bond sites 42 to the support material.

Each of the ionomer membranes shown in FIGS. 1-4 have reactive sites 15, or sites for exchanging and transporting an anion or cation through the membrane.

Figure 5:
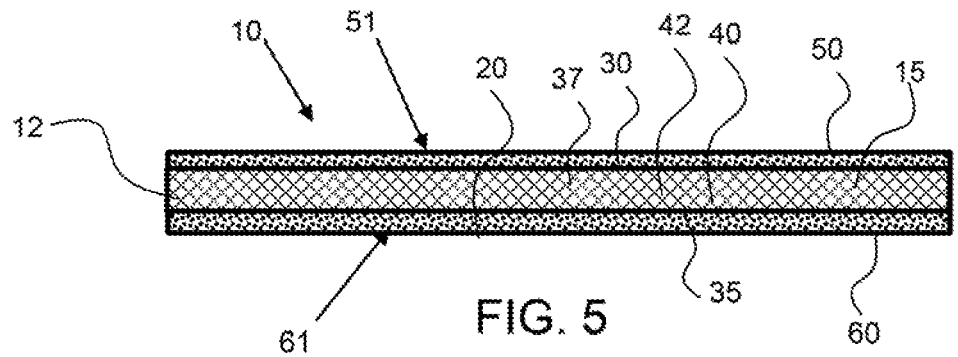
FIG. 5 shows a cross-section of an exemplary ion exchange membrane having a support material configured between a first ionomer layer on a first side and second ionomer layer on a second and opposing side to said first side wherein the degree of cross-linking of the ionomer is not the same through the thickness of the composite.

FIG. 5 shows a cross-section of an exemplary ion exchange membrane having a support material 40 configured between a first ionomer layer 50 on a first side 51 and second ionomer layer 60 on a second side 61; opposing said first side. The ionomer in-between the first side and second side or third ionomer portion 37 may be cross-linked to a different degree that either the first or second ionomer layer, or first ionomer portion 30 and second ionomer portion 35, respectively. The ionomer layers comprise cross-linked ion exchange polymer 20 and the ionomer is bonded at bond sites 42 to the support material to the support material 40. The ionomer may be imbibed into the support material and then cross-linked to a first degree, and then subsequent ionomer may be coated on the first and second sides to produce the first and second ionomer layers that may then be cross-linked to a different degree than the third ionomer portion 37. A very thin surface layer that is cross-linked to a higher degree may prevent migration of the ionomer from the middle layer or the third ionomer portion 37 out of the surfaces. The first and/or second ionomer layer may be cross-linked by exposure to UV light for example, wherein the light does not penetrate into the bulk of the composite membrane to cross-link the third ionomer portion 37.

Figure 6:
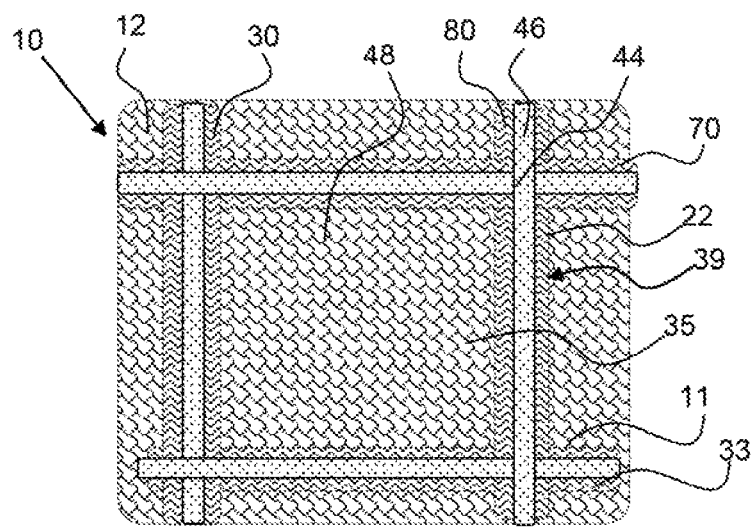
FIG. 6 shows a cross-section of an exemplary ion exchange membrane having a support material having an interface layer of ionomer bonded to with support material and second portion of ionomer filing the remainder of the void volume of the pore.

As shown in FIG. 6, an exemplary composite ion exchange membrane 11, comprise an ionomer 12 imbibed into a support material 40. The support material has nodes 44 interconnected by fibrils 46 and pores 48 in-between the structure. The support material also have a cross-linking compound 70 that bonds with a first ionomer portion 30. As described herein, a first ionomer portion may be imbibed into the support material, such as expended PTFE, to produce a support coating layer 33 that can then be bonded to the support material and/or cross-linked. A subsequent second ionomer portion 35 may then be imbibed into the remaining void volume of the pores. The second ionomer portion may be cross-linked to a different degree than the first ionomer portion. The first and second ionomer portion may have cross-links 22 at the interface 39 between the first and second ionomer portions.

Figure 7:
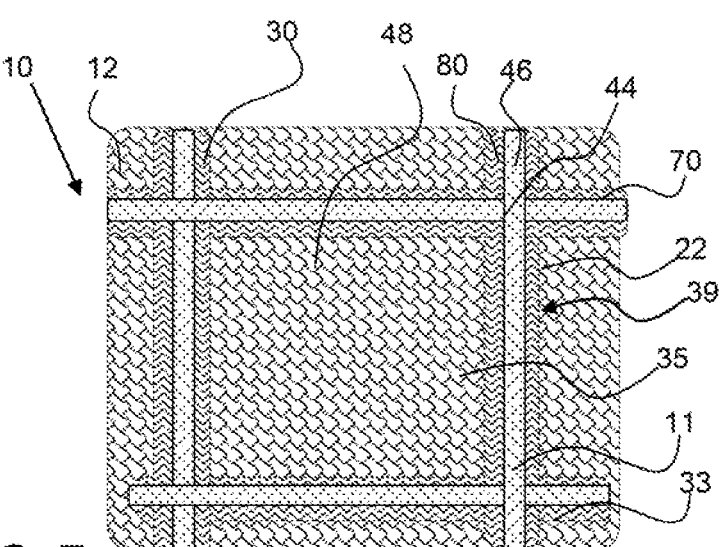
FIG. 7 shows a cross-section of an exemplary ion exchange membrane having a support material having a first ionomer portion that is proximal the support material and is cross-linked to a first degree and a second ionomer portion in the remainder of the void volume of the pore having a second degree of cross-linking.

As shown in FIG. 7 an exemplary composite ion exchange membrane 11, comprise an ionomer 12 imbibed into a support material 40. The support material has nodes 44 interconnected by fibrils 46 and pores 48 in-between the structure. The support material also have a cross-linking compound 70 that initiates cross-linking of a first ionomer portion 30. As described herein, a first ionomer portion may be imbibed into the support material, such as expended PTFE, to produce a support coating layer 33 that can then and then cross-linked to a first degree. A subsequent second ionomer portion 35 may then be imbibed into the remaining void volume of the pores. The second ionomer portion may be cross-linked to a different degree than the first ionomer portion. The first and second ionomer portion may have cross-links 22 at the interface 39 between the, first and second ionomer portions.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications combinations and variations of this invention provided they come within the scope of the appended claims and their equivalents.

What is claimed is:
1. An ion exchange membrane comprising:
a) an ion exchange polymer having reactive sites;
   wherein the ion exchange polymer is partially cross-linked having some portion of reactive sites cross-linked to form cross-linked sites;
   wherein the ion exchange polymer is an anion exchange polymer;
b) a support material having pores, wherein the ion exchange polymer is configured on a first side of the support material to form a first ionomer layer and is configured in the pores a support material to form an imbibed ionomer portion;
   wherein the support material comprises a cross-linking compound that is coupled to the support material forming bonding sites, and wherein the imbibed ionomer portion is bonded to the bonding sites of the cross-linking compound of the support material; and
   wherein first ionomer layer has a concentration of cross-linked sites that is at least 10% higher in mol % than a concentration of cross-linked sites of the imbibed ionomer portion; and
   wherein the cross-linking compound that is coupled to the support material is coated onto the support material and comprises divalent barium cations.

2. The ion exchange membrane of claim 1, wherein the ion exchange polymer is an acidic sulfonated polyetherketoneketone and is cross-linked with barium cations to create ionic crosslinks between the sulfonate groups attached to the aromatic rings of the polyetherketoneketone.

3. The ion exchange membrane of claim 1, wherein the cross-linked sites comprise a cross-linking agent selected from the group consisting of: polyisocyanates, polyurethane, blocked polyurethane, polyurea, blocked polyurea, polyamines, blocked polyamines and dicyanodiamides.

4. The ion exchange membrane of claim 3, wherein the cross-linked sites are formed by exposure to ultraviolet light.

5. The ion exchange membrane of claim 1, wherein the first ionomer layer is configured partially in the pores of the support material to form a support coating layer.

6. The ion exchange membrane of claim 1, wherein the first ionomer layer contains no support material on a first side of the ion exchange membrane.

7. The ion exchange membrane of claim 1, comprising a second ionomer layer that contains no support material on a second side of the ion exchange membrane.

8. The ion exchange membrane of claim 7, wherein the second ionomer layer has a concentration of cross-linked sites that is at least 10% higher than a concentration of cross-linked sites of the imbibed ionomer portion.

9. The ion exchange membrane of claim 1, wherein the ion exchange polymer extends through the pores of the support material from said first side to a second side of the support material.

10. The ion exchange membrane of claim 9, wherein the first ionomer layer is configured partially in the pores of the support material to form a support coating layer.

11. The ion exchange membrane of claim 1, wherein the support material is a microporous membrane having a mean flow pore size of 1 µm or less.

12. The ion exchange membrane of claim 1, wherein the support material is made out of a cross-linking compound.

13. The ion exchange membrane of claim 12, wherein the cross-linking compound of the support material comprises divalent barium cations.

* * * * *